Patented Oct. 22, 1946

2,409,699

UNITED STATES PATENT OFFICE 2,409,699

PREPARATION OF CYANOMETHYL DIALKYL ORTHOFORMATES

Donald J. Loder and William F. Gresham, Wilmington, Del., assignors to E. I. du Pont de Nemours & Company, Wilmington, Del., a corporation of Delaware No Drawing. Application September 7, 1944, Serial No. 553,108

5 Claims. (Cl. 260—464)

This invention relates to the preparation of cyanoalkyl orthoformates and more particularly to their preparation from the alkyl orthoformates and formaldehyde cyanhydrin.

An object of the present invention is to provide new compositions of matter. Another object is to provide a process for preparing cyanoalkyl orthoformates and more particularly cyanoalkyl dialkyl orthoformates by reacting alkyl orthoformates with aldehyde cyanhydrins. Yet another object is to provide conditions and catalysts for the reaction. Other objects and advantages of the invention will hereinafter appear.

The above and other objects of the invention are realized by subjecting an alkyl orthoformate to a reaction with an aldehyde cyanhydrin using a suitable condensation catalyst to accelerate the reaction. The reaction proceeds at fairly low temperatures although it is preferable to conduct the process at a temperature ranging between 75 and 150° C. Subsequent to the reaction the alcohol formed as a result of the reaction is removed by distillation, preferably under diminished pressure, and the cyanoalkyl dialkyl formate separated and purified by fractionation.

The reaction is illustrated by the generic equation:

$$HC(OR)_3 + HOR_1CN \rightarrow HC(OR)_2OR_1CN + ROH$$

in which R designates an alkyl and $R_1$ an alkylene group. More specifically, the reaction may be illustrated by this equation:

$$HC(OC_2H_5)_3 + HOCH_2CN \rightarrow$$
$$HC(OC_2H_5)_2OCH_2CN + C_2H_5OH$$

wherein ethyl orthoformate reacts with formaldehyde cyanhydrin to form cyanomethyl diethyl orthoformate.

The reaction is preferably conducted in the presence of an excess of the alkyl orthoformate based on stoichiometrical requirements, there being used in the order of from 1½ to 4 moles of the alkyl orthoformate per mole of the aldehyde cyanhydrin, although equimolar proportions or an excess of the aldehyde cyanhydrin may be used usually, however, with a sacrifice in yield. Condensation catalysts are employed such, for example, as zinc chloride, sulfuric acid, phosphoric acid and the like, which may be present in amounts ranging between 0.1 to about 5% by weight of the total reactants present.

The invention is illustrated by the following examples in which parts are by weight unless otherwise indicated.

*Example I.*—A round bottom glass flask is charged with 28.5 parts (0.5 M) of formaldehyde cyanhydrin, 148 parts (1 M) of ethyl orthoformate and 3 parts of zinc chloride. The reaction is conducted for approximately 4 hours at a temperature ranging between 35 and 95° C. Ethanol formed during the reaction is removed by distillation at a temperature of about 35° C. and under a pressure of approximately 105 mm. During the distillation 31.6 parts of ethanol is recovered. The product is then fractionated under a reduced pressure of about 2 mm. and cyanomethyl diethyl orthoformate having a boiling point of 59° C. at 1 mm. pressure is obtained in a yield of approximately 84%.

This example illustrates the advantages derived from the use of an excess of ethyl orthoformate while Example II illustrates the smaller yield obtained with equimolar proportions of reactants.

*Example II.*—The process of Example I is substantially duplicated with 57 parts (1 M) of formaldehyde cyanhydrin, 148 parts (1 M) of ethyl orthoformate and 3 parts of zinc chloride. Alcohol is removed during the reaction as in Example I and the cyanomethyl diethyl orthoformate obtained in a yield of approximately 56.2%.

The process illustrated in the examples may be used for the preparation of a number of related cyanoalkyl dialkyl orthoformates which may be produced by reacting the aldehyde cyanhydrins such as formaldehyde, acetaldehyde, propanal, butanal and the higher straight and branch chain aldehyde cyanhydrins with any alkyl orthoformate such, for example, as with methyl, ethyl, n-propyl, isopropyl and the higher straight and branch chain alkyl orthoformates. While it is preferable to employ the symmetrical alkyl orthoformates, unsymmetrical alkyl orthoformates may likewise be employed such as the methylethyl, methylpropyl, methylethylpropyl, and similar orthoformates containing mixed alkyl groups. As a result of such reactions a variety of cyanoalkyl dialkyl orthoformates may be produced such, for example, as cyanomethyl diethyl-, cyanoethyl dimethyl-, cyanopropyl diethyl-, and cyanoisobutyl di-isobutyl orthoformates.

The products obtained in accord with this invention are suitable for many purposes such, for example, as intermediates in organic syntheses and as solvents and plasticizers. They may be hydrogenated to form valuable amines, the hydrogenation being effected in accord with the general equation:

$$HC(OR)_2OR_1CN + H_2 \rightarrow HC(OR)_2OR_1CH_2NH_2$$

wherein R is an alkyl group and $R_1$ an alkylene group. More specifically, valuable amines such as aminoethyl diethyl orthoformate may be obtained in accord with the equation:

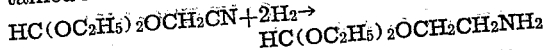
$HC(OC_2H_5)_2OCH_2CN + 2H_2 \rightarrow HC(OC_2H_5)_2OCH_2CH_2NH_2$

The hydrogenation of the aminoethyl orthoformates is preferably conducted under superatmospheric pressures between 50 and 1500 atmospheres and at temperatures ranging between 40 and 150° C. Any suitable hydrogenation catalysts may be employed such, for example, as nickel supported on kieselguhr, Raney nickel catalysts, cobalt catalysts, nickel chromite catalysts and the like.

The examples which follow illustrate preferred methods of converting the cyanoalkyl orthoformates to aminoalkyl orthoformates. In these examples parts are by weight unless otherwise indicated.

*Example III.*—A silver-lined pressure-resisting autoclave is charged with 31.8 parts (0.2 M) of cyanomethyl diethyl orthoformate, 85 parts (5 M) of anhydrous ammonia and 20 parts of a nickel catalyst supported on kieselguhr. The reaction is conducted at a temperature between 108 and 112° C. under a hydrogen pressure of about 700 atmospheres and for approximately 1½ hours. Pressure is then released from the autoclave after lowering the temperature and a 75.6% yield of beta-aminoethyl diethyl orthoformate, a colorless liquid having a boiling point of 88° C. at 10 mm. pressure, is obtained upon fractionation of the product.

*Example IV.*—The process of Example III is substantially duplicated employing 40 parts (0.25 M) of cyanomethyl diethyl orthoformate, 85 parts (5 M) of anhydrous ammonia and 20 parts of a nickel catalyst supported on kieselguhr. This reaction is conducted at a temperature between 103 and 125° C. for approximately 4 hours under a hydrogen pressure of about 700 atmospheres. Approximately an 87.5% conversion of the nitrile to the amine is realized.

We claim:
1. A process for the preparation of a cyanomethyl dialkyl orthoformate which comprises subjecting formaldehyde cyanhydrin to a reaction with an alkyl orthoformate in the presence of a condensation catalyst.
2. A process for the preparation of a cyanomethyl diethyl orthoformate which comprises subjecting formaldehyde cyanhydrin to a reaction with ethyl orthoformate in the presence of a condensation catalyst.
3. A process for the preparation of a cyanomethyl dialkyl orthoformate which comprises subjecting an aldehyde cyanhydrin to a reaction with a molar excess of an alkyl orthoformate at a temperature between 30 and 150° C. and in the presence of zinc chloride as the catalyst.
4. A cyanomethyl dialkyl orthoformate.
5. Cyanomethyl diethyl orthoformate.

DONALD J. LODER.
WILLIAM F. GRESHAM.